June 18, 1929.                C. GUETZOW                1,717,971
                             COOKING UTENSIL
                           Filed March 7, 1927
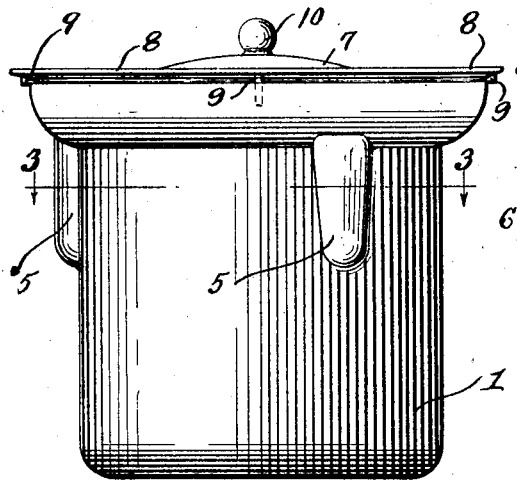
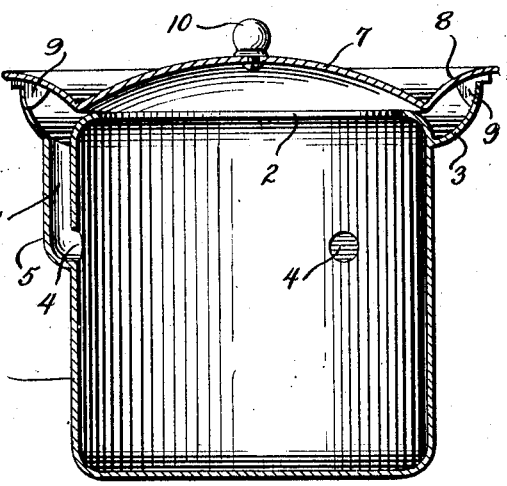
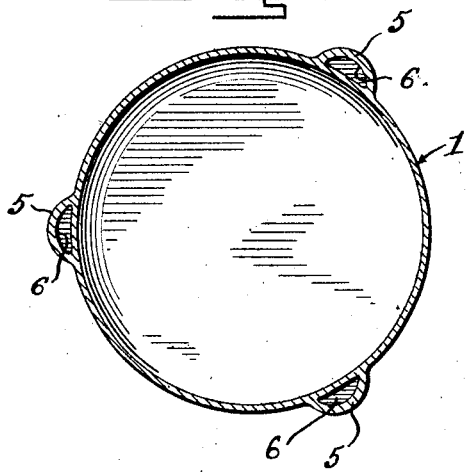
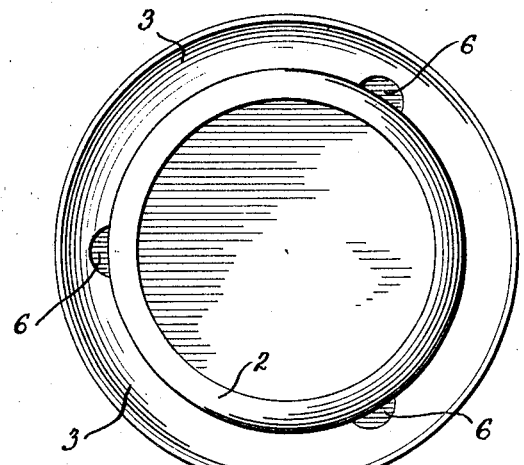
Charles Guetzow,
  Inventor
WITNESSES
Geo. H. Forbes.
F. E. Nadman.
By Richard B. Owen
                Attorney Patented June 18, 1929.

1,717,971

UNITED STATES PATENT OFFICE.

CHARLES GUETZOW, OF SAN BENITO, TEXAS.

COOKING UTENSIL.

Application filed March 7, 1927. Serial No. 173,472.

This invention relates to the class of household culinary utensils and pertains particularly to covered receptacles in which food or articles are boiled.

The primary object of this invention is to provide, in a manner as hereinafter set forth, a covered receptacle having means incorporated in the construction thereof to prevent boiling over of the contents, when in use.

The invention contemplates the provision of a receptacle having an inwardly curved top edge and an outwardly and upwardly curved flange formed about the top adjacent the curved edge and extending a substantial distance thereabove to provide a gutter about the top of the receptacle and from this gutter passage-ways lead downwardly to apertures formed in the side wall of the receptacle a substantial distance below the top of the same, to lead back into the receptacle any liquid which may boil up over the top edge and run into the gutter. In this manner, no matter how much the contents of the receptacle boil up over the top of the body, the surrounding gutter will catch the overflow and it will be returned to the receptacle through the passage-ways referred to.

A further and final object of this invention is to provide, in a manner as hereinafter set forth, a utensil of the character described, which will be of simple construction, efficient for the purpose described, and comparatively inexpensive to manufacture.

Numerous other objects and advantages of the present invention will become apparent as the description of the same proceeds, and the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 shows the utensil of the character embodying this invention, in side elevation, Figure 2 is a vertical section through the utensil, Figure 3 is a transverse section taken upon the line 3—3 of Figure 1, and, Figure 4 is a top plan view of the receptacle with the cover thereof removed.

Referring more particularly to the drawing in detail, wherein like numerals of reference indicate corresponding parts throughout the several views, the numeral 1 indicates the body proper of the receptacle which is here shown as of circular cross sectional design and having the wall thereof straight throughout except as will presently be described. It is to be understood, however, that applicant does not confine himself to this configuration, but the vessel may be square, oblong or oval as desired and the walls thereof may be inclined or curved as is usual in some cooking utensils.

The upper edge portion of the body 1 is turned inwardly to provide the curved inwardly directed flange 2 and surrounding the top portion of the body is an outwardly and upwardly directed curved gutter 3, the lower portion of which is connected to the body of the receptacle below the curved upper edge portion of the body of the same, and the upper edge of this gutter extends a slight distance above the top of the receptacle body as is clearly shown in Figure 2.

The wall of the receptacle body is provided a substantial distance downwardly from the top, with apertures 4 and the outer surface of the wall adjacent each of these apertures supports the integrally connected semi-circular body 5 which in association with the adjacent wall portion provides the return passage 6, the lower portion of the passage opening through the aperture 4 located at the lower end thereof. The upper end of this passage opens through the bottom of and into the gutter 3 as is shown in Figure 2.

A lid is provided for the receptacle which comprises a central domed portion 7 merging at its peripherial edge with an outwardly and upwardly curved flange 8. As is shown in Figure 2 the overall diameter of the domed portion 7 of the lid is slightly greater than the diameter of the top of the receptacle body. The flange portion 8 of the lid is so formed that when the lug members 9 secured at spaced intervals about the under surface thereof adjacent the free edge, are positioned upon the free edge of the gutter 3 of the receptacle, the dome 7 will be raised slightly above the curved upper edge portion 2 of the receptacle. From this it will also be understood that the flange 8 is held free from contact with the upper edge of the gutter 9 thus permitting steam to escape from the receptacle.

A handle of appropriate design is secured to the lid as at 10.

When the utensil of the present invention is in use, whether it be as a cooking utensil, a wash boiler, or other household utensil, the contents, should they boil up as is often the case in heating milk, or soapy water, will flow over the flange 2 into the gutter 3 and drain back into the receptacle through the passages 6 and ports 4. Thus the cooking or heating operation may be carried forward much more rapidly than in the ordinary receptacle for the heat may be maintained at a higher degree therebeneath, than would otherwise be possible.

Having thus described my invention, what I claim is:

1. In a structure of the character described, a receptacle body having the top edge thereof curved inwardly throughout, a gutter structure exteriorly of and surrounding the top of said receptacle and curving outwardly and upwardly a slight distance above the top edge thereof, liquid return pipes leading from the lower portion of said gutter to a point a substantial distance below the top edge of the receptacle and opening through the wall of the same thereinto, a cover for the receptacle of a diameter to extend over the open top of the receptacle and the gutter, and means supporting the cover upon the upper edge of the gutter with its under side spaced above the upper edge of the body.

2. In a structure of the character described, a receptacle body having the top edge thereof curved inwardly throughout, a gutter structure exteriorly of and surrounding the top of said receptacle and curving outwardly and upwardly a slight distance above the top edge thereof, liquid return pipes leading from the lower portion of said gutter to a point a substantial distance below the top edge of the receptacle and opening through the wall of the same thereinto, a cover member for the receptacle having a central portion overlying and of substantially the same diameter as the receptacle body, and a surrounding upwardly and outwardly curving peripheral portion designed to overlie said gutter, and lift members upon the under face of said peripheral portion of the lid designed to rest upon the edge of the gutter to maintain the peripheral portion free from contact therewith and maintaining the periphery of the said central portion free from contact with the curved top edge of the body.

In testimony whereof I affix my signature.

CHARLES GUETZOW.